(12) United States Patent
Ishii

(10) Patent No.: US 6,371,233 B2
(45) Date of Patent: Apr. 16, 2002

(54) LIGHTED STORAGE COMPARTMENT FOR SNOWMOBILE

(75) Inventor: Kazuhisa Ishii, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/746,214

(22) Filed: Dec. 22, 2000

(30) Foreign Application Priority Data

Dec. 24, 1999 (JP) .......................................... 11-365940

(51) Int. Cl.⁷ ........................ B62M 27/02; B62M 29/00
(52) U.S. Cl. ..................... 180/182; 297/195.1; 362/488
(58) Field of Search ....................... 180/182; 297/195.1, 297/195.11, 180.1, DIG. 1; 362/487, 488

(56) References Cited

U.S. PATENT DOCUMENTS

| | | | |
|---|---|---|---|
| 4,008,777 A | * 2/1977 | Juto et al. | 180/182 |
| 4,418,782 A | * 12/1983 | Nakazima | 180/182 |
| 5,746,498 A | * 5/1998 | Rogge | 362/488 |
| 5,944,380 A | * 8/1999 | Atherly | 297/195.1 |
| 6,086,149 A | * 7/2000 | Atherly | 297/195.1 |

* cited by examiner

Primary Examiner—Brian L. Johnson
Assistant Examiner—Matt Luby
(74) Attorney, Agent, or Firm—Knobbe, Martens, Olson & Bear, LLP

(57) ABSTRACT

A snowmobile comprises a seat having a soft cushion layer, a more firm boundary layer, and a rigid support structure. Passages are provided between the soft cushion layer and a chamber such that air can be exchanged from within the seat and the chamber depending upon whether the operator is seated on the seat or standing above the seat. When an operator sits on the seat, air is forced out of the seat cushion material and into the chamber. When the operator stands and the seat cushion rebounds, air is provided to the seat from the chamber. The snowmobile also includes a lit trunk. The trunk is lit by a light bulb used for a rear tail light assembly. The light bulb is secured in a mounting plate that is formed of a translucent material that provides a window into the trunk. The light bulb can have an integrally formed socket, which can be translucent as well, to increase the amount of light transmitted into the trunk. The trunk preferably is not the chamber that communicates with the seat.

22 Claims, 5 Drawing Sheets

LIGHTED STORAGE COMPARTMENT FOR SNOWMOBILE

RELATED APPLICATIONS

This application is based upon and claims priority to Japanese Patent Application No. HEI 11-365,940, filed on Dec. 24, 1999.

BACKGROUND OF THE INVENTION

1. Field of the Invention

The present invention generally relates to storage compartments for land vehicles. More particularly, the present invention relates to lighted internal storage compartments that can be substantially sealed from inclement conditions.

2. Description of the Art

Snowmobiles are popular land vehicles that can be used in the winter and in cold and snowy conditions. Often the vehicles are used as transportation vehicles in rather harsh climates. As transportation vehicles, these vehicles often contain storage compartments, such as trunks, that are located behind the seat. The compartments provide a location in which various articles can be stored while moving from one location to another. In addition, these vehicles often include headlights and tail lights for operation under dark conditions. For instance, when commuting from a work location to home, or when simply traveling between two different lodging locations, the travel may occur during rather dark and inclement conditions.

Accordingly, operators of snowmobiles often have to carry with them a flashlight or some other auxiliary light source. The light source can be used to view into the storage compartments to find the items that the snowmobile may have been transporting. This light has to be stored during operation and increases the bulk of the items transported on the snowmobile. While a light could be provided into the trunk compartment, such an additional light would increase manufacturing costs as well as complexity of the vehicle.

In addition, the trunk often is a substantially sealed compartment. With the trunk being a sealed compartment, part of the seal is often provided between a cushion of the seat and a body frame of the vehicle. In addition, the seat, which often is made of a foam material, often is in communication with the trunk compartment via an air passage. In this manner, when the seat is first sat upon, air that is compressed out of the foam enters into the trunk compartment, thereby breaking a seal with the lid of the trunk and the trunk compartment to depressurize the trunk. Moreover, when the operator stands up or removes some weight from the seat, the seat absorbs air from within the trunk compartment through the air passages. This movement of air creates a slight vacuum within the trunk compartment and can suck melted snow or other moisture into the trunk compartment and/or into the seat itself. Obviously, such a situation is undesirable.

SUMMARY OF THE INVENTION

Accordingly, a lighted trunk compartment that does not have an air passage through to the seat is desired. Preferably, such a construction allows the seat to vent into the engine compartment, which is often open to the atmosphere, such that air can be exchanged between the seat materials and the engine compartment. Additionally, the lighted storage compartment preferably comprises a translucent or transparent wall that allows light provided by the tail light assembly to illuminate at least a portion of the storage compartment.

Accordingly, one aspect of the present invention involve a snowmobile comprising a vehicle body. The vehicle body is supported by at least one steering ski and is powered by a drive unit comprising an engine and a track. The vehicle body also comprises at least one compartment having an opening to the ambient atmosphere. The vehicle body further comprises a seat with a trunk disposed generally rearward of the seat and a tail light disposed generally rearward of the trunk. The seat comprises a support plate and a cushion. The cushion is in fluid communication with the at least one compartment and the tail light comprises at least a light bulb that is capable of generating light. The trunk has a window positioned between the trunk and the tail light that allows light from the light bulb to pass into the trunk.

Another aspect of the present invention involves a snowmobile comprising a vehicle body. The vehicle body is supported by at least one steering ski and is powered by a drive unit. The drive unit comprises an endless track that is driven by an engine. A seat is disposed above at least a portion of the drive unit. A storage compartment is positioned generally rearward of the seat and a running light assembly is positioned proximate the storage compartment. A window is disposed between the running light assembly and the storage compartment and the window is arranged and configured to pass light from the running light assembly into the storage compartment.

A further aspect of the present invention involves a snowmobile comprising a vehicle body supported by a steering ski and a drive unit. A seat is disposed above at least a portion of the drive unit with a storage compartment being mounted rearward of at least a portion of the seat. A running light is positioned proximate the storage compartment and a further compartment is positioned within at least a portion of the vehicle body. The snowmobile further comprises means for providing light from the running light assembly to the storage compartment and means for exchanging air between the seat and the second compartment.

BRIEF DESCRIPTION OF THE DRAWINGS

These and other features, aspects, and advantages of the present invention will now be described with reference to the drawings of a preferred embodiment which is intended to illustrate and not to limit the invention. The drawings comprise six figures.

DETAILED DESCRIPTION OF THE PREFERRED EMBODIMENT OF THE PRESENT INVENTION

Figure 1:
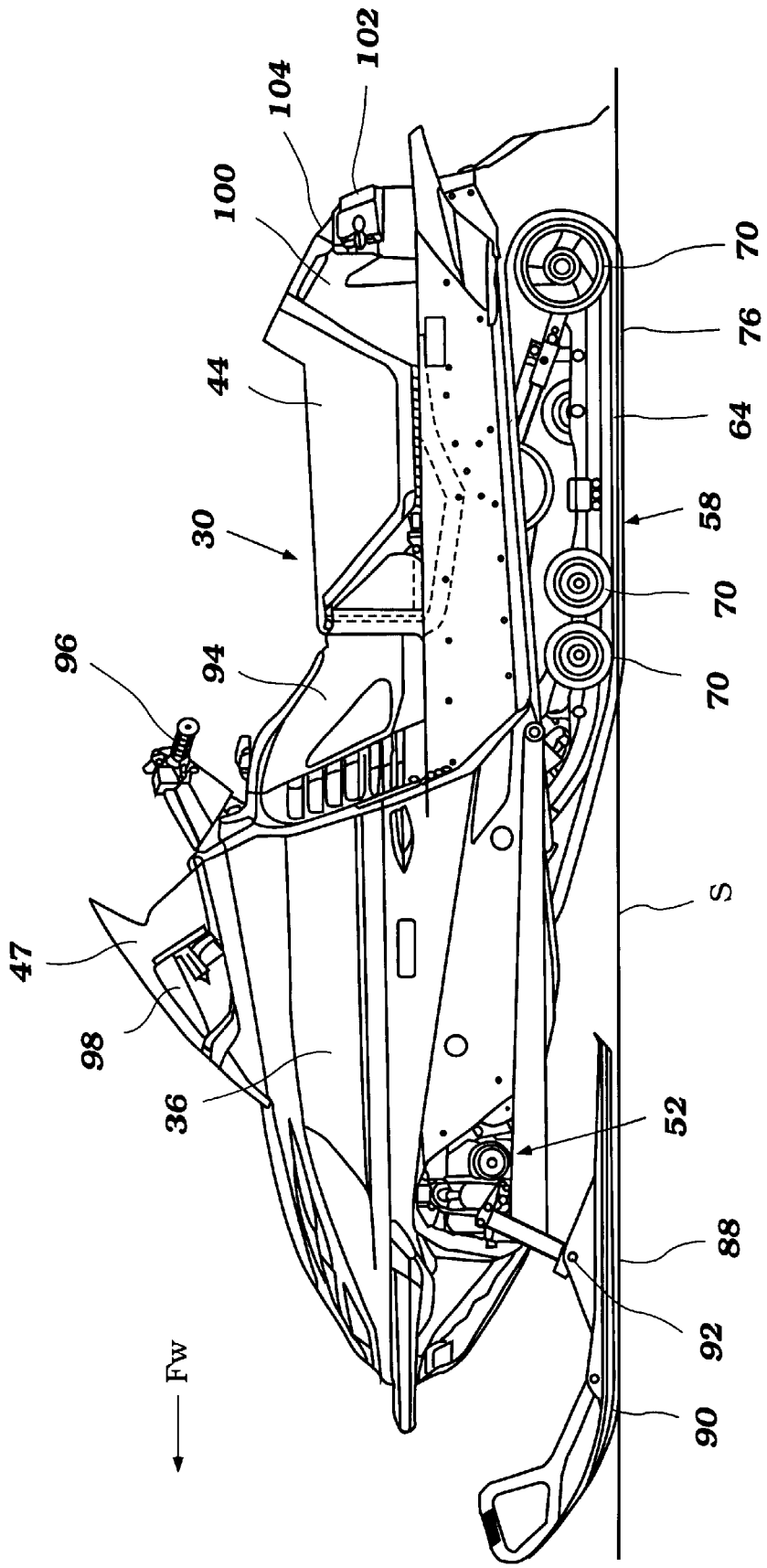
FIG. 1 is a simplified side elevational view of a snowmobile configured and arranged in accordance with certain features, aspects, and advantages of the present invention. Certain internal components have been illustrated with hidden lines.
Figure 2:
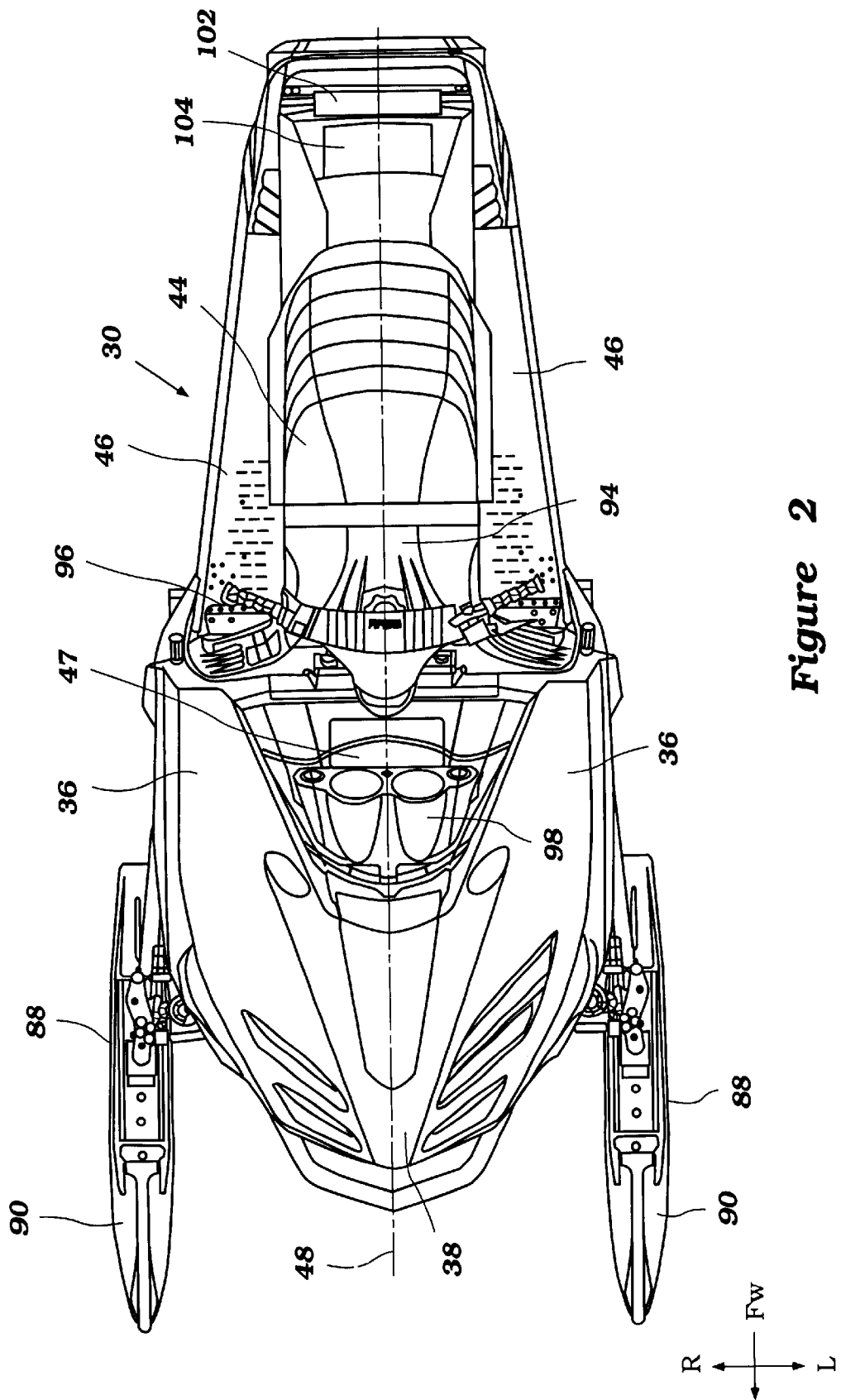
FIG. 2 is a top plan view of the snowmobile of FIG. 1.

With reference initially to FIGS. 1 and 2, an overall construction of a land vehicle is illustrated therein. In the illustrated arrangement, the land vehicle comprises a snow vehicle 30 configured and arranged in accordance with certain features, aspects, and advantages of the present invention. The snowmobile 30 is an exemplary land vehicle. Although the present invention will be shown and described in the context of the illustrated snowmobile, some aspects and features of the present invention also can be employed with other vehicles, such as personal watercraft, ATVs, golf carts, and the like in manners that would be apparent to those of ordinary skill in the art.

In general, the snowmobile 30 operates over a terrain which is indicated generally by the reference numeral S in FIG. 1. The terrain typically is covered with snow and/or ice and often includes bumps and other rough operating surfaces. The reference mark FW in the figures indicates a forward direction in which a snowmobile 30 generally operates. As used in this description, the terms right and left will mean at or to the respective sides in a top plan view relative to the forward direction FW, as indicated in FIG. 2.

As will be appreciated, the illustrated snowmobile 30 generally comprises a frame assembly, which is not shown. The frame assembly can include a plurality of frame members which can be formed with sheet metal, metal pipes, or the like and which preferably are assembled in any suitable manner to have sufficient rigidity for operation. Two side panels 36 generally cover the sides of the frame assembly in the illustrated arrangement. In addition, a cowling member or hood 38 covers a forward portion of the frame assembly. Preferably, the cowling member 38 is detachably coupled with the frame assembly or pivotably hinged thereto at one end so as to pivot about the hinged portion. The side panels 36 and the cowling member 38 can be made of plastic or synthetic resin. In addition, a bottom plate can be included which would cover a bottom portion of the frame assembly. Thus, a substantially closed compartment is formed over a forward portion of the frame assembly by the side panels 36, the cowling member 38, and any bottom plate used.

A seat 44 can be disposed above a rear portion of the frame assembly to accommodate a rider and any passengers. In some arrangements, the seat 44 can be positioned such that the rider can place his or her feet in front of the seat 44. In the illustrated arrangement, however, the seat 44 is disposed such that a rider straddles the seat with a foot positioned on each side of the seat 44. Thus, in the illustrated arrangement, a pair of foot rests 46 are disposed on both sides of the seat 44. A windshield 47 extends upwardly from the cowling member 38 and is disposed forwardly of the operator to protect the operator from snow and/or wind in manner well known to those of ordinary skill in the art.

With reference now to FIG. 2, the illustrated snowmobile 30 is generally symmetrically formed relative to an imaginary center point 48 that extends generally vertically fore and aft through the snowmobile 30. Due to the arrangement of the various body components, such as the seat 44, the cowling 38, and the side panels 36, for instance, the illustrated frame assembly is substantially enclosed and is not shown in these figures.

Side panels 36 and the bottom plate placed in front of the seat 44 together with a cowling member 38 define a generally closed cavity. A prime mover assembly 52 can be enclosed within the cavity. Because the cowling member 38 is detachably coupled with or pivotally hinged to the frame assembly, the rider, a mechanic, or a repairman can access the primer mover assembly 52 for maintenance or the like. The illustrated prime mover assembly 52 generally comprises an internal combustion engine and a transmission which transmits power from the engine to a drive assembly through a drive shaft. The drive assembly 58 preferably is positioned generally below the seat 44 such that the operator's weight is positioned over the drive assembly 58. The drive assembly 58, although somewhat schematically shown in FIG. 1, preferably includes a slide rail unit 64, a drive sprocket, which is concealed in this view, and a set of idle sprockets 70. The slide rail units 64 comprise a pair of slide rails which extend fore and aft along the center plane 48. Preferably, the slide rails are spaced apart from one another. The respective idle shafts and sprockets extend generally transverse to the center plane 48 and are journaled on the respective portion of the illustrated slide rail units 64.

The slide rail unit 64 together with the drive sprocket and the idle sprocket 70 support an endless drive belt 76. More specifically the slide rail 64 abuts a back side of the drive belt 76, which is opposite the side of the drive belt 76 facing the terrain S, and the drive sprocket engages the drive belt 76 to provide rotational movement to the drive belt 76. The respective idle sprockets 70 contact the drive belt 76 in known manners.

In the illustrated arrangement, the snowmobile 30 also includes a pair of steering skis 88. Each ski 88 preferably comprises a ski member 90 and knuckle pin 92. The ski member 90 includes a contact area which typically abuts the terrain S during movement of the snowmobile 30. The knuckle pin 92 is coupled with the ski member 90 at a generally top, center portion of the ski member 90 and allows the ski member to pivot fore and aft such that the ski member 90 can follow rough surfaces of the terrain S.

With reference still to FIGS. 1 and 2, the illustrated snowmobile 30 also features a fuel tank 94 which is disposed slightly forward of the seat 44 in the illustrated arrangement. The fuel tank 94 can be contoured and configured to accept the knees of an operator in manners well known to those of ordinary skill in the art. In addition, a steering handle assembly 96 can be positioned generally vertically above at least a portion of the fuel tank 94. The steering handle assembly 96 can include clutch levers, brake levers, parking brake levers, throttle controls, on/off switches and the like. In addition, forward of the steering handle assembly 96, a cluster of gauges 98 can be included to transmit information regarding operational characteristics of the snowmobile 30 to the operator.

Rearward of the seat 44 in the illustrated arrangement, a storage compartment 100 is provided. In addition, rearward of the storage compartment 100 in the illustrated arrangement is a brake light assembly 102 which is generally positioned partially below a lid 104 which extends over at least a portion of an opening into the storage compartment 100. The storage compartment 100, the lid 104 and the brake light assembly 102 will be described in more detail below. While the following description generally relates to the illustrated arrangement, other compartment having running lights positioned proximate to them can also be arranged in similar manners.

Figure 3:
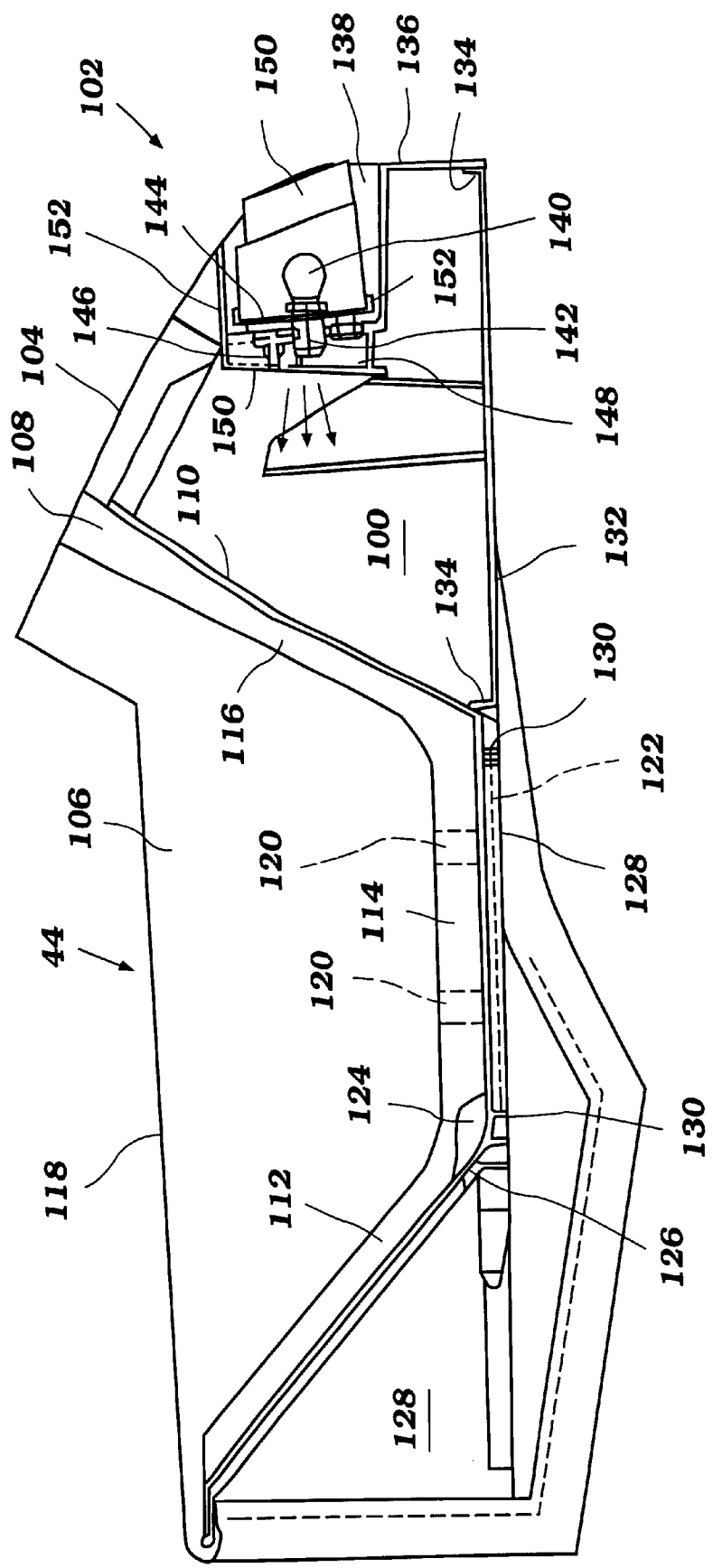
FIG. 3 is an enlarged, partially sectioned side elevation view primarily showing a seat and storage compartment arrangement along with a tail light mounting configuration.

With reference now to FIGS. 3, 4, 5, and 6, the seat and its mounting arrangement will first be described in more detail. In addition, a discussion of the rear storage compartment or trunk and the lighting assembly follows. As best illustrated in FIG. 3, the seat 44 generally comprises a soft and generally resilient cushion portion 106 as well as a stiffer, less resilient boundary portion 108. In addition, the seat 44 also comprises a stiff support surface 110. As best illustrated in FIG. 3, the support surface 110 is generally concave and forms a trough in which a saddle-shape seat assembly comprising the cushion portion 106 and the boundary portion 108 are supported. The support surface 110 can be formed of any suitable material. In some arrangements, the support surface 110 is formed from metals such as steel or aluminum. In other more lightweight and low-cost arrangements, the support surface 110 can be formed from resin materials such as thermoplastics. Preferably, the support surface 110 is positioned over an opening in the body of the snowmobile 30 and is secured in position in any suitable manner.

The boundary portion 108 generally comprises a forward portion 112, a bottom portion 114, and a rear portion 116. The forward portion slopes slightly downward and rearward while the bottom portion preferably extends generally horizontally in a rearward direction. In addition, the rear portion 116 slopes upward and rearward. Preferably, the boundary portion 108 is formed of a high density material such that air does not easily flow through the boundary portion 108. Of course, in some arrangements, the boundary portion 108 can transmit the flow of air fairly readily.

The cushion portion 106 rests on top of the boundary portion 108 and is formed from a more low density material such that the cushion portion 106 is more resilient and forgiving. The cushion portion 106 also easily absorbs and releases air to allow the cushion portion 106 to easily deform under the weight of the operator. The cushion portion 106 may be covered by a top skin 118 which can be formed integrally with the cushion portion 106 or can be a separate member attached to and covering the rest of the seat 44. Providing skins on seat cushions is well known to those of ordinary skill in the art and any suitable technique can be used. For instance, the cushion material used in the cushion portion 106 can be a skinned low density polyethylene or the cushion material of the cushion portion 106 can be a foam-type material with an outer canvas, plastic, synthetic, or any other suitable material cover.

Figure 5:
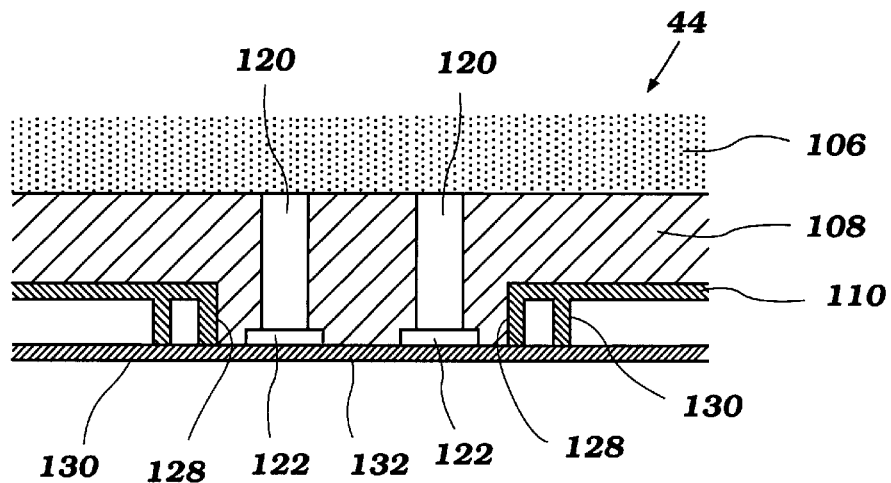
FIG. 5 is an enlarged section view of a portion of the seat mounting arrangement taken along the line 5—5 in FIG. 4.
Figure 6:
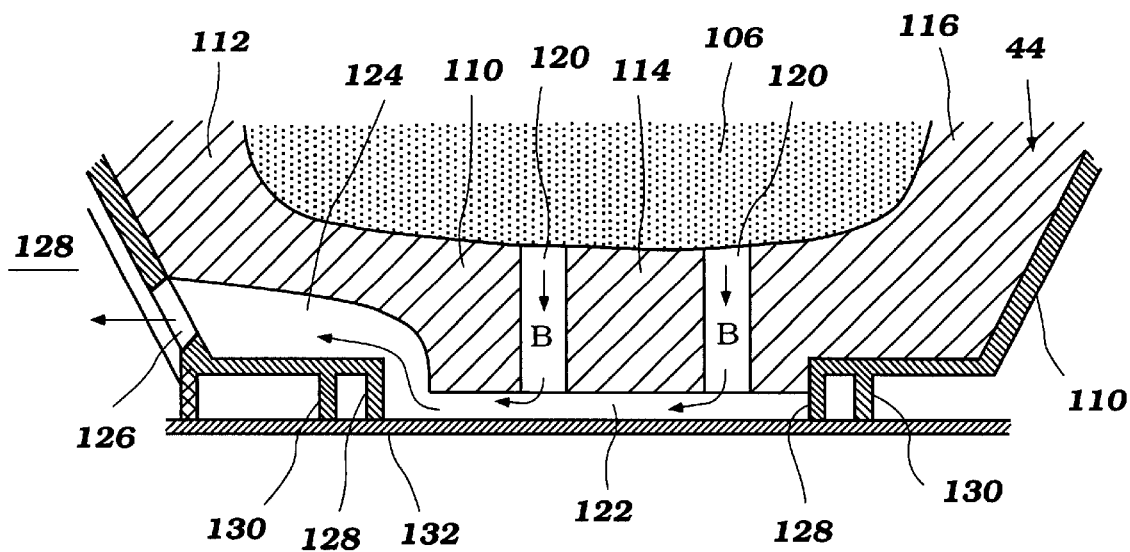
FIG. 6 is an enlarged, partially sectioned view of the seat mounting arrangement of FIG. 4 taken along the line 6—6.

With continued reference to FIG. 3, and with additional reference to FIGS. 5 and 6, an air passage arrangement will be described in more detail. In the illustrated arrangement, the boundary portion 108, generally inhibits the free flow of air into and out of the cushion portion 106. Accordingly, the boundary portion 108 is provided with a series of holes 120 to transmit air into and out of the cushion portion 106. While two groupings of two sets of two holes (i.e., eight holes) are illustrated in the illustrated arrangement, other numbers and configurations of holes can be used. Moreover, in the illustrated arrangement each of the two sets of holes is arranged to open into a channel 122. With reference to FIG. 6, which is a section through a channel 122 and FIG. 5, which is a section through a set of holes 120 in crossing both channels 122, the channels allow transmission of air from within the cushion portion 106 to an opening 124, which extends through an aperture 126 in the illustrated arrangement into a larger air-containing chamber. For instance, in some arrangements, the opening 124 may extend through an aperture or other suitable passage into the engine compartment while, in the illustrated arrangement, the passage extends into a chamber 128 in which a fuel tank can be positioned. Of course, the number of channels, openings and passages can be varied. Preferably, the flow rate of the air is accounted for in sizing the passage ways between the seat and the chamber.

Figure 4:
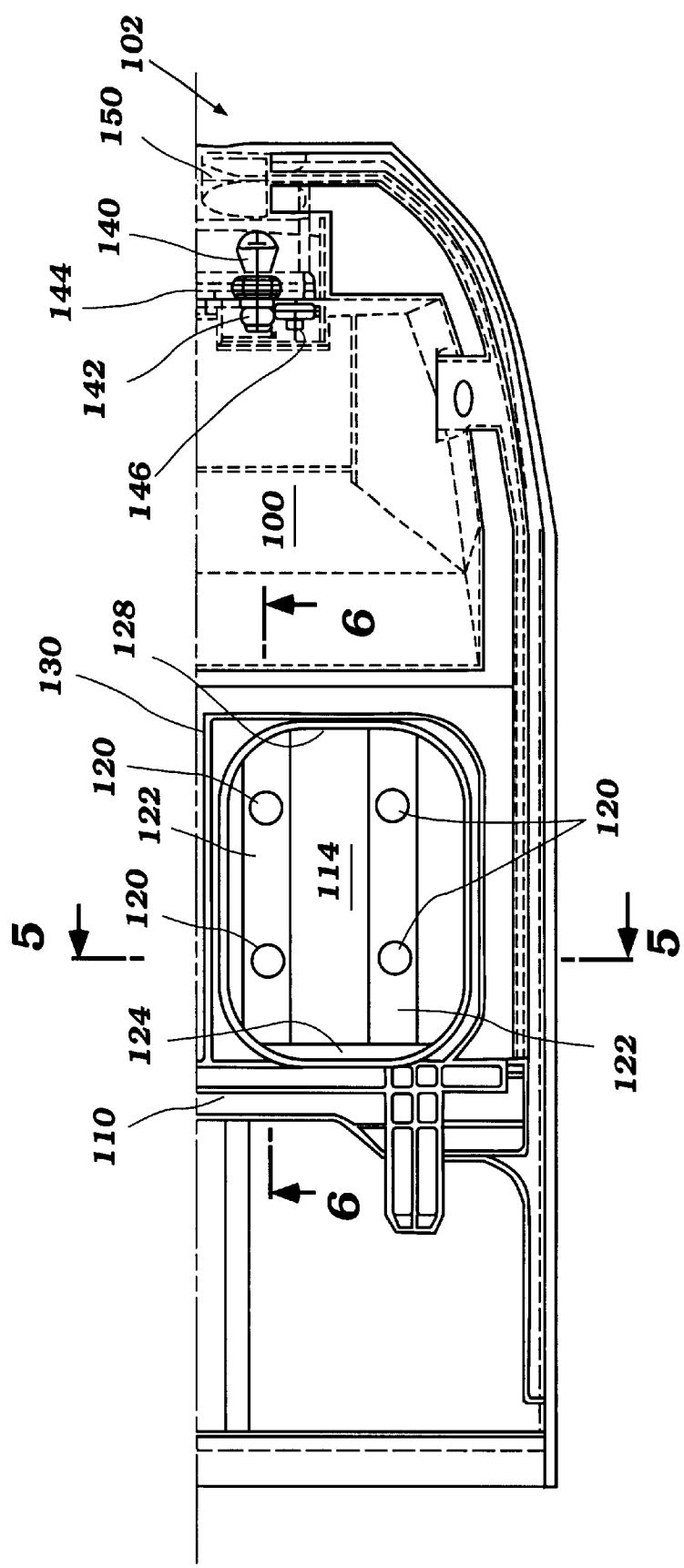
FIG. 4 is a bottom plan view of a portion of a seat mounting arrangement, storage compartment and light mounting configuration having certain features, aspects, and advantages in accordance with the present invention.

With continued reference to FIG. 4, the illustrated lower surface is that of one-half of the full support surface 110. Preferably, the other half is a mirror image of the illustrated half. In the illustrated arrangement, the support surface 110 contains a through-hole 128 which is surrounded by a supporting rib 130 that extends around its outer perimeter. The support rib 130 and the rib that defines the opening 128 rest on a portion of either the vehicle frame or the vehicle body 132. This is clearly shown in FIGS. 5 and 6. In the illustrated arrangement, a portion of the boundary portion 108 extends down into the opening 128 and rests on the body frame or body panel surface 132. This portion of the boundary portion 108 also contains the channels 122 such that an airflow passage is defined between the body panel 132 and the boundary portion 108. This air passageway is in communication with the material of the cushion portion 106 and any enlarged chamber 128 through the opening 124 and the aperture 126 in the illustrated arrangement. Of course, other constructions suitable for placing the openings that extend through the boundary portion 108 in communication with an enlarged chamber capable of exchanging air from within the cushion 106 also can be used. The illustrated arrangement, however, provides increased support for the passages while supporting the operator in the location which the operator generally is seated. In addition, it should be noted that the opening 128 preferably is disposed such that the pair of openings 128 will be positioned under the operator's body and such that the pressure from the operator's body is passed almost directly downward into the openings 128. The illustrated arrangement advantageously exchanges air from within the seat cushion into a compartment which is not generally substantially sealed from the atmosphere. In other words, air is free to travel into and out of the seat cushion without adversely effecting any sealed compartments in arrangements configured in manner similar to that illustrated.

With reference again to FIG. 3, the trunk 100 is generally positioned rearward of the seat 44. The trunk 100 can be defined in part by a portion of the support surface 110. In addition, the trunk may also be defined in part by a lower trunk surface 132. The lower think surface 132 may be integrally formed with the vehicle frame or the vehicle body or may be secured in position in any suitable manner. In the illustrated arrangement, the lower trunk surface 132 includes a plurality of upstanding flanges 134 which can be secured in position using any suitable technique, such as welding, brazing, using fasteners such as rivets, screws, or the like, or it can be clipped into position.

A tail light housing 136 also is disposed rearward of the trunk 100. The tail light housing 136 preferably includes a recess 138 into which a tail light assembly 102 can be mounted. The recess can include an opening on a forward facing wall for reasons that will become apparent. A replaceable light bulb 140 is mounted into a socket 142 in accordance with any of a number of standard techniques. Preferably, the tail light assembly includes the light bulb 140 and the socket 142. More preferably, the light bulb 140 and the socket 142 are formed in a single unit. For instance, the light bulb 140 may include a pair of upstanding pins that are received within a groove of the socket 142 such that the light bulb may be twisted into position. In other arrangements, the light bulb 140 may contain a threaded surface which threads into a portion of the socket 142.

The socket 142 and the attached light bulb 140 may be secured into position within the recess 138 through the use of a support plate 144. The support plate may be mounted into the recess 138 using threaded fasteners such as the one illustrated at 146 or by using clips, mounting tabs or any other suitable technique. In the illustrated arrangement at least a portion of the socket 142 extends through the support plate 144 into a recess formed forward of the recess 138. The recess preferably is substantially enclosed by the support plate 144.

This recess 148 can include an opening 150 which allows communication between the recess 148 and the trunk compartment 100. Preferably, the recess 148 is enclosed by an upper surface such that when the trunk lid 104 is opened and closed, any liquids contained around the seal of the trunk lid 104 do not fall within the recess 148. Of course, in some arrangements, the recess 148 may include a drain or other method of removing accumulating liquids.

In the illustrated arrangement, the trunk lid 104 preferably is arranged to pivot upward and rearward such that the opening of the trunk lid would pull snow and other foreign debris outward and away from the opening defined around the upper edge of the trunk compartment 100. In this manner, the illumination arrangement illustrated in FIGS. 3 and 4 is largely protected from the outside elements.

A lens 150 is provided over a portion of the tail light assembly 102 to enclose the light bulb 140 and a portion of the socket 142. The lens 150 can be mounted in any suitable arrangement as such mounting configurations are well known to those of ordinary skill in the art. However, in the illustrated arrangement, the lens 150 is secured within a pair of flanges 152 that extend outward from a portion of the support plate 144. Thus, the light bulb 140 and a portion of the socket 142 are contained within a protected environment inside the lens cover 150. In some arrangements, the socket 142 of the tail light assembly 102 is made of a translucent or transparent material. Preferably, the socket, and in some arrangements, the supporting member, 144 are made of a light transmitting material such that light from within the tail light assembly 102 may pass into the trunk compartment 100 for illuminating at least a portion of the trunk compartment 100. More preferably, the support plate 144 is manufactured from a translucent material such as a clear plastic such that light being generated by the light bulb 140 may pass through the support plate and into the trunk compartment 100. In further configurations a rearward reflecting mirror may be provided or any other suitable reflective surface may be provided to shine a portion of the light provided by the light bulb 140 into the trunk compartment 100 or any other suitable storage compartment. In this manner, the trunk compartment 100 or any other suitable storage compartment can be illuminated through the same light bulb 140 used to light the tail light assembly 102. This advantageously reduces a number of components required to light the trunk compartment 100 and helps to reduce and maintain low cost for manufacturing.

In snowmobiles arranged and configured in accordance with certain features, aspects, and advantages of the present invention, the snowmobile has a well-lit rear storage compartment. In some arrangements, the storage compartment is a trunk. The trunk is lit through the same light bulb that is used to light the tail light assembly. Accordingly, the number of components required to light the storage compartment can be reduced. In addition, the storage compartment does not communicate with the cushion materials of the seat. In other words, air being exchanged into and out of the seat when an operator sits on or stands up from the seat does not work its way into or out of the storage compartment. In this manner, the air volume contained within the storage compartment does not change when the operator sits down or stands up. This protects against the sucking in of water that forms around any openings or seals of the lid during operation of the vehicle. Accordingly, an air passage is provided to place the seat in fluid communication with another air compartment that is open to the atmosphere. For instance, in the illustrated arrangement, the seat is placed in communication with a compartment in which the fuel tank is mounted. In other arrangements, the seat may be placed in communication with an engine compartment or another compartment open to the atmosphere. In further configurations, the seat may vent directly to the atmosphere through a side panel or a water trap type device. Such arrangements reduce the likelihood of water being drawn back into the seat and allow the seat to deform and restore to its original position and condition.

Although the present invention has been described in terms of a certain preferred embodiment, other embodiments apparent to those of ordinary skill in the art also are within the scope of this invention. Thus, various changes, modifications, and alterations may be made in the above-described embodiment, without departing from the spirit and scope of the invention. Moreover, not all of the features, aspects, and advantages are necessarily required to practice the present invention. Therefore, some of the features, aspects, and advantages may be separately practiced from the other features, aspects, and advantages while still practicing a part or all of the above-described invention. Accordingly, the scope of the present invention is intended to be defined only by the claims that follow.

What is claimed is:

1. A snowmobile comprising a vehicle body, said vehicle body being supported by at least one steering ski and being powered by a drive unit comprising an engine and a track, said vehicle body also comprising at least one compartment having an opening to the ambient atmosphere, said vehicle body further comprising a seat with a trunk disposed generally rearward of said seat and a tail light disposed generally rearward of said trunk, said seat comprising a support plate and a cushion, said cushion being in fluid communication with said at least one compartment and said tail light comprising at least a light bulb that is capable of generating light and said trunk having a window positioned between said trunk and said tail light that allows light from said light bulb to pass into said trunk.

2. The snowmobile of claim 1, wherein said window comprises a translucent material.

3. The snowmobile of claim 1, wherein said window comprises a transparent material.

4. The snowmobile of claim 1, wherein said window comprises an open aperture.

5. The snowmobile of claim 1, wherein said light bulb is integrally formed with a socket and said socket is formed of a translucent material.

6. The snowmobile of claim 1, wherein said cushion and said trunk are not in fluid communication with each other.

7. The snowmobile of claim 6, wherein said support plate substantially divides said cushion from said trunk.

8. The snowmobile of claim 1, wherein said at least one compartment is a compartment adapted to contain at least a portion of a fuel tank of said snowmobile.

9. The snowmobile of claim 8, wherein a forward extending passage extends from a vertically extending passage from said cushion to transmit air from said cushion into and out of said at least one compartment.

10. The snowmobile of claim 9, wherein said seat further comprises a boundary layer that separates said cushion from said support plate and said vertical passage extends through at least a portion of said boundary layer and said forward extending passage extends at least partially through said boundary layer.

11. The snowmobile of claim 10, wherein said boundary layer further comprises a subcompartment that is in direct fluid communication with said at least one compartment.

12. The snowmobile of claim 10, wherein said forward extending passage is at least partially defined by a portion of said vehicle body.

13. A snowmobile comprising a vehicle body, said vehicle body being supported by at least one steering ski and being powered by a drive unit, said drive unit comprising an endless track that is driven by an engine, a seat being disposed above at least a portion of said drive unit, a storage compartment being positioned generally rearward of said seat and a running light assembly being positioned proximate said storage compartment, a window being disposed between said running light assembly and said storage compartment, said window being arranged and configured to pass light from said running light assembly into said storage compartment.

14. The snowmobile of claim 13, further comprising a second compartment, said seat being in fluid communication with said second compartment and not in fluid communication with said storage compartment.

15. The snowmobile of claim 14, wherein said second compartment is arranged and configured to receive at least one of a fuel tank and said engine.

16. The snowmobile of claim 13, wherein said seat comprises a foam-type cushion material and a support plate, said support plate containing an opening through which said foam-type cushion material can exchange air with said second compartment.

17. The snowmobile of claim 16, wherein said seat further comprises a boundary layer, wherein said boundary layer is interposed between said cushion material and said support plate, said boundary layer comprising at least one opening that extends through the opening in the support plate such that said cushion may communicate with said compartment through said at least one passage.

18. The snowmobile of claim 13, wherein said window comprises a translucent material.

19. The snowmobile of claim 18, wherein said window comprises a support plate that supports a socket of said running light assembly.

20. The snowmobile of claim 19, wherein socket of said running light assembly is also translucent.

21. The snowmobile of claim 13, wherein said running light assembly is a rearwardly disposed light and said storage compartment is a trunk.

22. A snowmobile comprising a vehicle body supported by a steering ski and a drive unit, a seat being disposed above at least a portion of said drive unit with a storage compartment being mounted rearward of at least a portion of said seat, a running light being positioned proximate said storage compartment and a further compartment being positioned within at least a portion of said vehicle body, said snowmobile further comprising means for providing light from said running light assembly to said storage compartment and means for exchanging air between said seat and said second compartment.

* * * * *